(12) United States Patent
Mussack et al.

(10) Patent No.: US 11,905,674 B2
(45) Date of Patent: Feb. 20, 2024

(54) MULTI-COUPLER AND COVER THEREOF

(71) Applicant: DEERE & COMPANY, Moline, IL (US)

(72) Inventors: Jeffery Mussack, Eldridge, IA (US); Jeffrey Hochstatter, Sr., Wyanet, IL (US); John J. Swanson, Walcott, IA (US)

(73) Assignee: DEERE & COMPANY, Moline, IL (US)

( * ) Notice: Subject to any disclaimer, the term of this patent is extended or adjusted under 35 U.S.C. 154(b) by 564 days.

(21) Appl. No.: 17/127,546

(22) Filed: Dec. 18, 2020

(65) Prior Publication Data

US 2022/0195688 A1 Jun. 23, 2022

(51) Int. Cl.
| | |
|---|---|
| *E02F 3/36* | (2006.01) |
| *E02F 9/22* | (2006.01) |
| *F16L 39/04* | (2006.01) |
| *F16L 37/56* | (2006.01) |

(52) U.S. Cl.
CPC .......... *E02F 3/3654* (2013.01); *E02F 9/2264* (2013.01); *F16L 37/56* (2013.01); *F16L 39/04* (2013.01)

(58) Field of Classification Search
CPC ....... F16L 37/56; F16L 39/04; F16L 2201/80; F16L 35/00; E02F 3/3654; E02F 9/2264; E02F 9/2275; H01R 13/005
See application file for complete search history.

(56) References Cited

U.S. PATENT DOCUMENTS

| | | | | | |
|---|---|---|---|---|---|
| 5,984,371 | A | * | 11/1999 | Mailleux | ................ F16L 37/56 |
| 2019/0093808 | A1 | * | 3/2019 | Danelli | ................... F16L 37/56 |
| 2019/0242511 | A1 | * | 8/2019 | Danelli | ................... F16L 37/56 |
| 2019/0309772 | A1 | * | 10/2019 | Faivre | |

FOREIGN PATENT DOCUMENTS

| | | | | |
|---|---|---|---|---|
| EP | 1950484 B1 | * | 8/2010 | ............. F16L 37/56 |
| EP | 2818596 A2 | | 12/2014 | |
| KR | 20190096062 A | | 8/2019 | |
| WO | WO2019229202 A1 | | 12/2019 | |

OTHER PUBLICATIONS

EP-1950484-B1—Machine Translation—English (Year: 2010).*
Multi Coupler AKA Single Point Coupler, pp. 1-6.
Faster new Slide 4-line multi connection coupling, pp. 1, [online], [retrieved on May 11, 2020] Retrieved from the Internet <URL: https://hose-coupling-world.com/faster-new-slide-4-line-multi-connection-coupling/>.

(Continued)

*Primary Examiner* — William S. Choi (57) ABSTRACT

A multi-coupler of a work vehicle includes a first portion and a cover. The first portion has a coupling surface. The first hydraulic connector is arranged on the coupling surface. The cover is movable between a first position in which the cover covers the coupling surface and a second position in which the coupling surface is uncovered by cover. The cover has a cover shell defining an interior cavity. The cover also includes an insert received into the interior cavity of the cover shell. The insert is operable to absorb a fluid that escapes from the first hydraulic connector.

19 Claims, 10 Drawing Sheets

(56) References Cited

OTHER PUBLICATIONS

Multi Coupling 4 Lines Mounted on the Hydraulic Command SDM122, pp. 1-23, retrieved from a catalogue.
Multi Coupler AKA Single Point Coupler, pp. 1-6. [published on Jun. 27, 2015].
John Deere Combine Single Point Connector. [publicly available before Dec. 18, 2020] Screenshot from<URL: https://www.youtube.com/watch?v=-DjK8IYjXrc>, when the video was available.
John Deere Single Point Coupling Cover (Part No. H201368) [publicly available before the Dec. 18, 2020.] Screenshot from: <URL: https://shop.deere.com/us/product/H201368%3A-Single-Point-Coupling-Cover/p/H201368>.
Multi Coupling 4 Lines Mounted on the Hydraulic Command SDM122, pp. 1-23, retrieved from a catalogue. [publicly available before Dec. 18, 2020].
John Deere Manual, pp. 1-3 [retrieved/downloaded on Nov. 2, 2020] Retrieved from Internet: <URL: manuals.deere.com/omview/OMH229937_19/OUO6075_00008B9_19_20APR07_1.htm>.

\* cited by examiner

MULTI-COUPLER AND COVER THEREOF

RELATED APPLICATIONS

NA.

FIELD OF THE DISCLOSURE

The present disclosure relates generally to a multi-coupler that establish connection between a hydraulic source and a hydraulic implement(s) of a work vehicle.

BACKGROUND OF THE DISCLOSURE

Multi-couplers are used in work vehicles. The multi-couplers generally provide a quick and convenient connection between a hydraulic source and at least one hydraulic implement of a work vehicle. The hydraulic source may be a hydraulic pump in the work vehicle. Work vehicles utilizing hydraulic power to operate an implement may include, but are not limited to, agricultural equipment, such as a combine, tractor, harvester, or loader; construction equipment, such as a backhoe, dump truck, dozer, excavator, motor grader or scraper; or forestry equipment, such as a feller buncher or a skidder.

SUMMARY OF THE DISCLOSURE

According to an aspect of the present disclosure, a multi-coupler of a work vehicle includes a first portion and a cover. The first portion has a coupling surface. The first hydraulic connector is arranged on the coupling surface. The cover is movable between a first position in which the cover covers the coupling surface and a second position in which the coupling surface is uncovered by cover. The cover has a cover shell defining an interior cavity. The cover also includes an insert received into the interior cavity of the cover shell. The insert is operable to absorb a fluid that escapes from the first hydraulic connector.

According to an aspect of the present disclosure, a cover operable of a multi-coupler of a work vehicle includes a cover shell and an insert. The cover shell is movable relative to a first portion of the multi-coupler between a first position in which the cover shell covers a first hydraulic connector and a second position in which the cover shell exposes the first hydraulic connector. The insert is received into an interior cavity formed by the cover shell. The insert is formed of a material that absorbs a fluid released from the first hydraulic connector.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

A multi-coupler of a work vehicle can establish multiple connections at the same time. In some implementations, the connections include one or more hydraulic connections. In some other implementations, the connections include one or more hydraulic connections and one or more electrical connections. It is noted that the coupler or connector described below provides a physical connection between two separate components. Because of such physical connection, the hydraulic fluid or electrical power, which can include electrical signals, can be transferred from one component to the other.

Figure 1A:
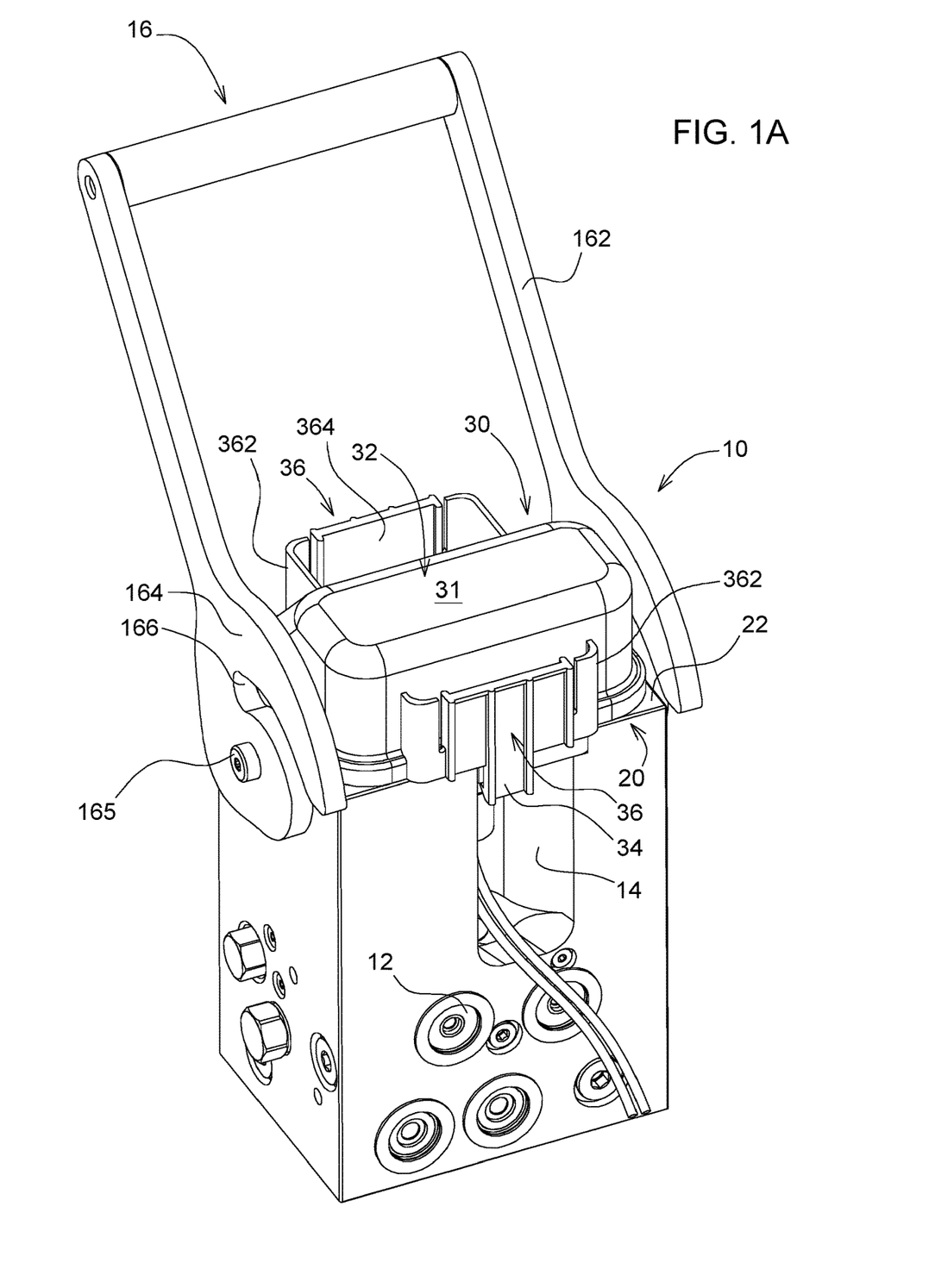
FIG. 1A is a perspective view of a multi-coupler with a first portion and a second portion disconnected.

FIG. 1A demonstrates a multi-coupler 10 in a decoupled condition with a cover 30 covering multiple connectors (couplers) of the multi-coupler 10. The connectors or couplers are collectively referred to hereinafter as "connectors." FIG. 2 is an exploded view of the multi-coupler 10 and demonstrates multiple connectors when the cover 30 is removed. Referring to FIGS. 1A, 1B, 1C and 2, the multi-coupler 10 of a work vehicle includes a first portion 20 operable to provide an interface for the connections. The first portion 20 in this implementation has five hydraulic connectors 24 that are assembled into bores of the first portion 20. The hydraulic connectors 24 are arranged on a coupling surface 22 of the first portion 20. The first portion 20 also includes an electrical connector 26 arranged on the coupling surface 22. However, as explained above, in other implementations, the first portion 20 may omit electrical connectors. The hydraulic connectors 24 shown on the coupling surface 22 are ports of the hydraulic fluid, for example. As shown in FIG. 1A, there are hydraulic connectors 12 on the side of the multi-coupler 10 that function as ports for the hydraulic fluid. The multi-coupler 10 also includes an electrical cable receiving channel 14 to receive the electrical connector 26 and an electrical cable coupled to the electrical connector 26.

The cover 30 of the multi-coupler 10 is movable between a first position (FIG. 1A) in which the cover 30 covers the coupling surface 22 and a second position in which the coupling surface 22 is uncovered by cover 30.

Figure 1B:
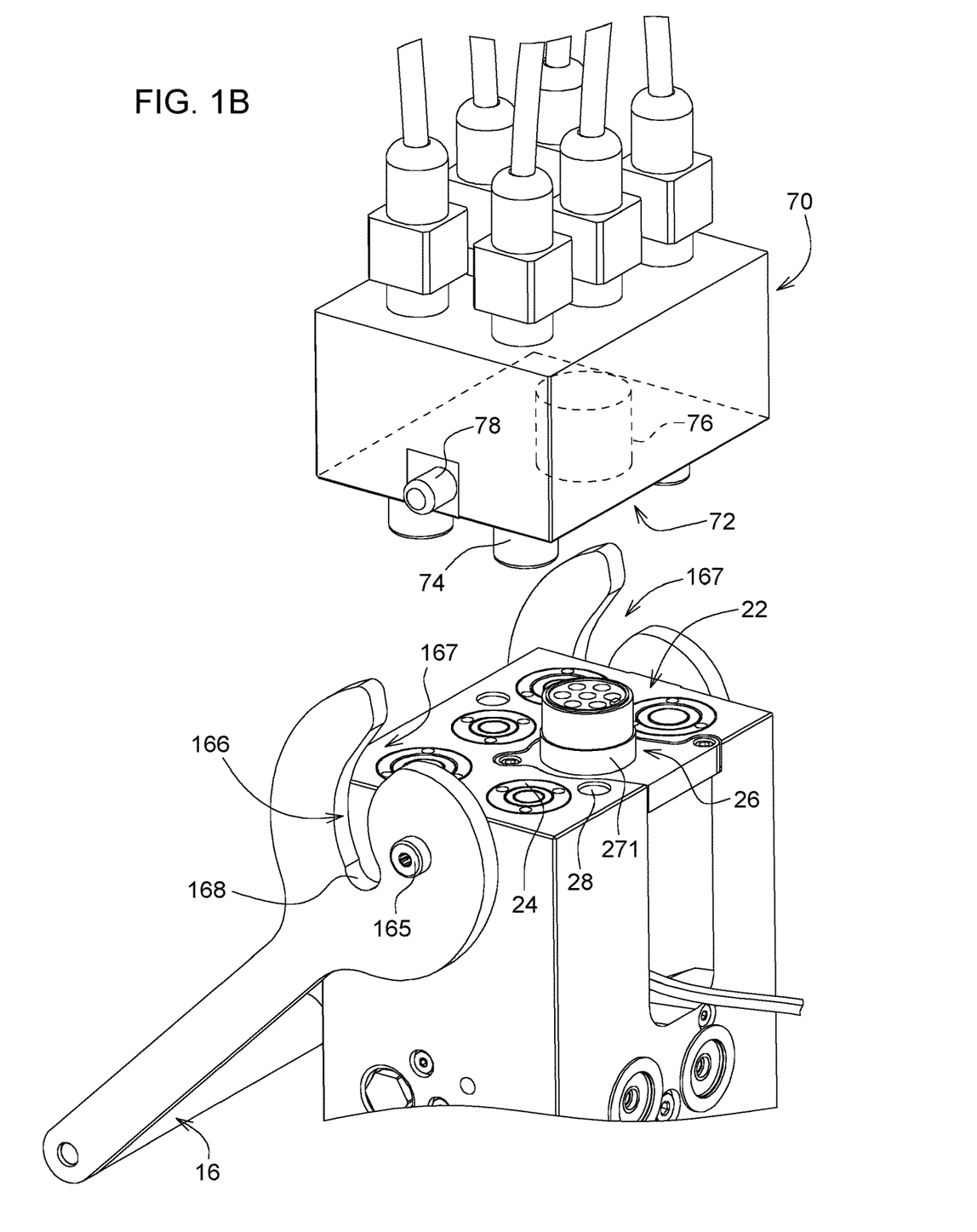
FIG. 1B is a perspective view of the multi-coupler of FIG. 1A with the first portion and a second portion disconnected.
Figure 1C:
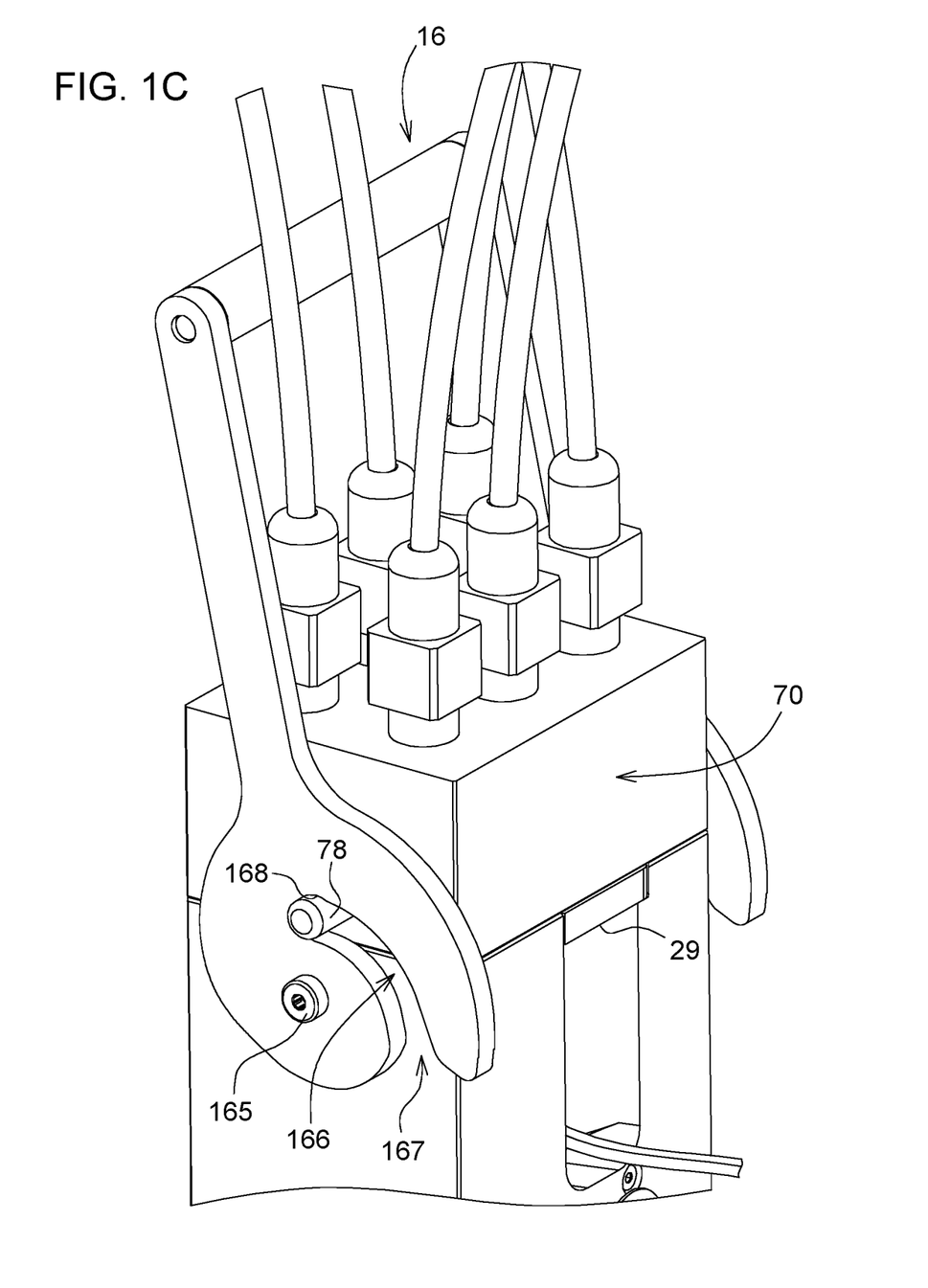
FIG. 1C is a perspective view of the multi-coupler of FIG. 1A where the first portion and the second portion connected.
Figure 2:
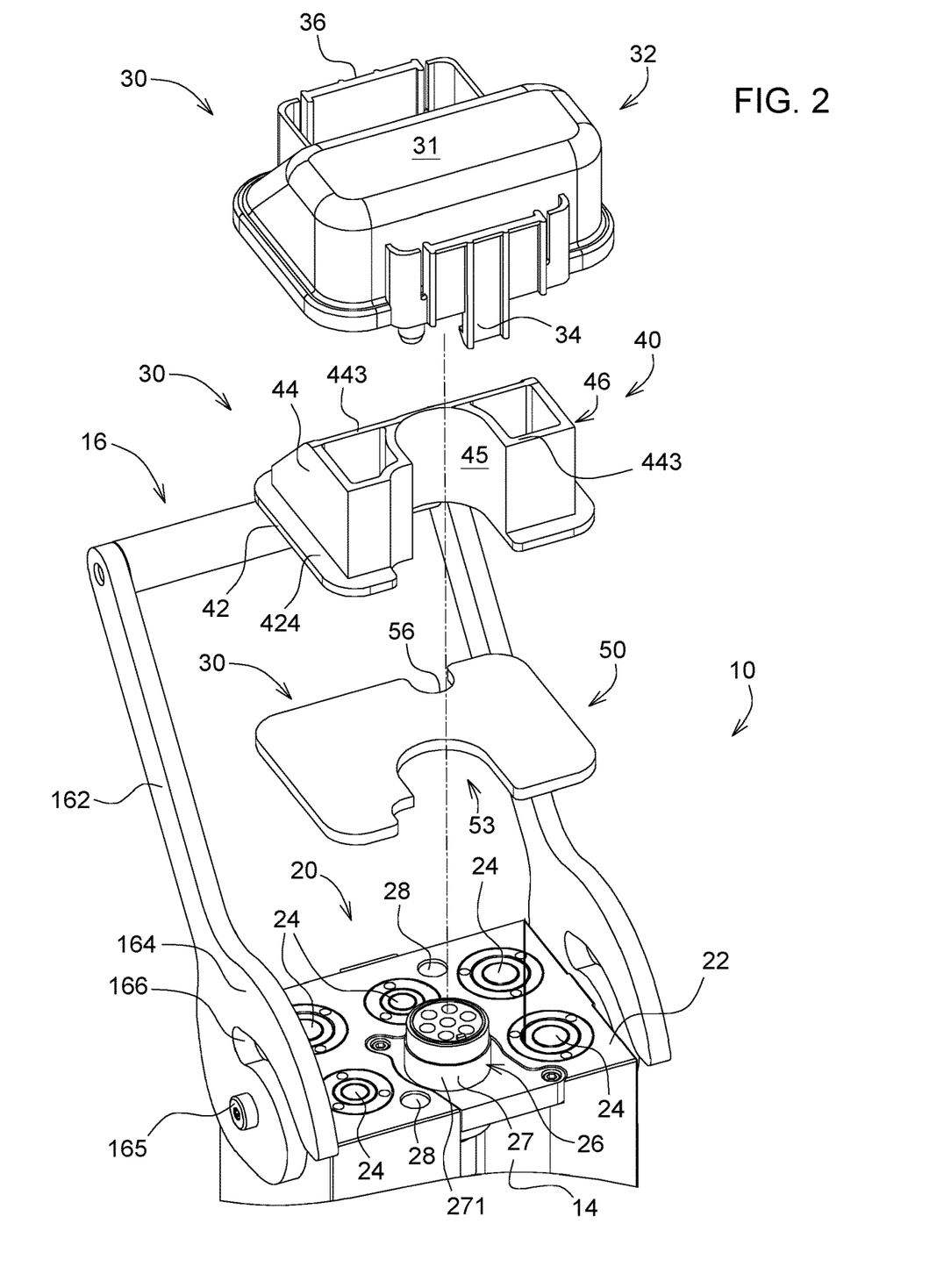
FIG. 2 is an exploded view of the cover and a first portion of the multi-coupler of FIG. 1A.

Referring to FIGS. 1B and 1C, the multi-coupler 10 includes a second portion 70 selectively coupled to the first portion 20. The first portion 20 is used to provide input or output of the hydraulic fluid or electrical signals from the work vehicle. The second portion 70 is used to provide input or output of the hydraulic fluid or electrical signals from the implement.

The multi-coupler 10 includes a lever 16 that has two lever arms 162. Each end of the lever arms 162 forms a cam 164. The lever 16 is rotatable about a pivot 165. An operator can push or pull the lever 16 to make the cam 164 rotate about the pivot 165. Each cam 164 also includes an eccentric slot 166. When the cover 30 is removed, the coupling surface 22 of the first portion 20 is exposed, as shown in FIG. 1B. The second portion 70 of the multi-coupler 10 has a second coupling surface 72 having multiple hydraulic connectors 74 corresponding to the hydraulic connectors 24 and an electrical connector 76 corresponding to the electrical connector 26 of the first portion 20. The coupling surface 22 and the second coupling surface 72 mate to form hydraulic and electrical connections. When the operator starts to couple the first portion 20 of the multi-coupler 10 and the second portion 70 of the multi-coupler 10, a locking pin 78 on two sides of the second portion 70 of the multi-coupler 10 is initially disposed at an open end 167 of the eccentric slots 166. When the cam 164 of the lever 16 is rotated in a first direction, as shown in FIG. 1C, the locking pins 78 move relative to the eccentric slots 166 from the open end 167 of the eccentric slots 166 to a closed end 168 of the eccentric slots 166, such that the second portion 70 will move towards the first portion 20 and the hydraulic connectors 74 and the electrical connector 76 of the second portion 70 connect with the corresponding hydraulic connectors 24 and the electrical connector 26 of the first portion 20 of the multi-coupler 10. As shown in FIGS. 1B, 1C, and 2, the ends 241 of the hydraulic connectors 24 are shown at the coupling surface 22. In the illustrated example, the hydraulic connectors 24 are female connectors, and, when the second portion of the multi-coupler 10 engages the first portion 20, the male hydraulic connectors 74 of the second portion 70 are received into the respective hydraulic connectors 24 of the first portion 20. In other implementations, the hydraulic connectors 24 may be male connectors, and the corresponding hydraulic connectors 74 of the second portion 70 may be female hydraulic connectors. At the same time, the electrical connector 76 of the second portion 70 and the electrical connector 26 of the first portion 20 couple together. When the cam 164 of the lever 16 rotates in a second direction, opposite the first direction, each of the locking pins 78 slides from the closed end 168 of the eccentric slot 166 to the open end 167 of the eccentric slot 166. In response, the hydraulic connectors 74 of the second portion 70 are decoupled from the hydraulic connectors 24 of the first portion 20.

Some hydraulic fluid may leak from the hydraulic connector 24 of the first portion 20 when the first portion 20 and the second portion 70 are decoupled. As a result, some hydraulic fluid may remain on the coupling surface 22. The hydraulic fluid on the coupling surface 22 soils the coupling surface 22. Further, the released hydraulic oil may collect dust, grain, or other particles, further soiling the coupling surface 22. The cover 30 in the present disclosure absorbs the hydraulic fluid, such as the hydraulic oil released by decoupling of the first portion 20 and the second portion 70.

Referring to FIGS. 2-5, the cover 30 includes a cover shell 32. The cover shell 32 protrudes to form a sloped surface 312 at an exterior 31 of the cover shell 32. The sloped surface 312 assists in shedding dust or crop material such that the dust and crop material does not build up on the cover shell 32. The cover shell 32 also defines an interior cavity 33. In the illustrated example, the cover 30 also include a supporting component 40 and insert 50. The insert 50 is received into the interior cavity 33 of the cover shell 32. The insert 50 is operable to absorb a fluid that escapes or is released from the hydraulic connectors 24. The cover 30 holds the insert 50, thereby preventing debris from accumulating on the coupling surface 22 as well as absorbing any hydraulic oil released from the hydraulic connectors 24.

Figure 5:
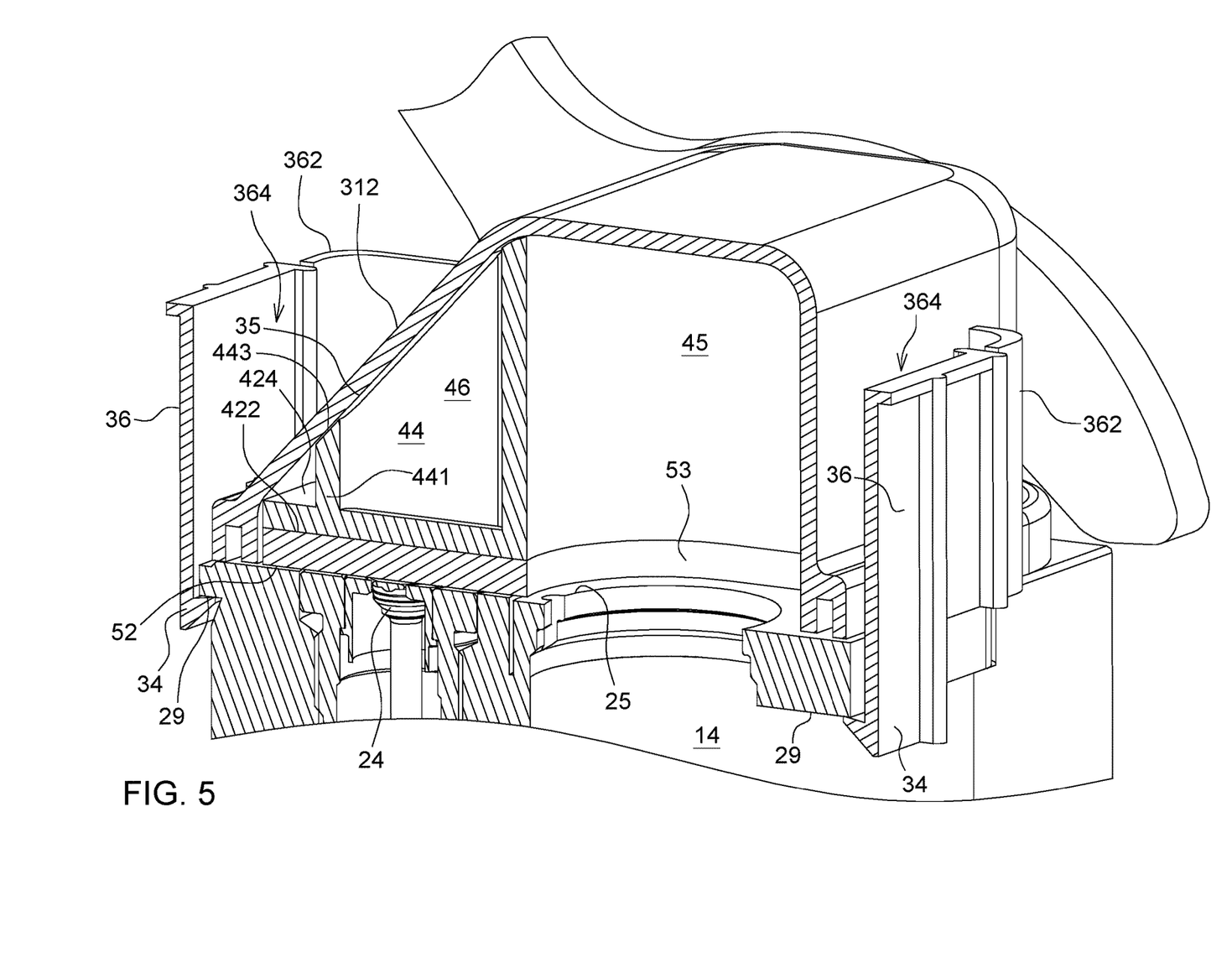
FIG. 5 is a cross-sectional view of the multi-coupler of FIG. 1A, where an electrical connector is omitted.

The insert 50 comprises an absorbing surface 52 that faces the coupling surface 22 and contacts the hydraulic connectors 24 when the cover 30 is in the first position, as shown in FIG. 5. The electrical connector 26 is omitted from FIG. 5 for clarity. The insert 50 is a replaceable, absorbent material that is installed in the cover 30. Consequently, the insert 50 helps to clean and maintain cleanliness of the hydraulic connectors 24 (couplers) and capture hydraulic oil released from the hydraulic connectors 24.

As shown in FIGS. 2 and 5, the insert 50 includes a recess 53 in the absorbing surface 52. The electrical connector 26 includes a protrusion 27 that protrudes from the coupling surface 22. A location of the protrusion 27 aligns with a location of the recess 53 formed in the insert 50. An outer surface 271 of the protrusion 27 extends through the recess 53 of the insert 50 without contacting the insert 50 when the cover 30 is in the first position. A gap is formed between the recess 53 and the outer surface 271 of the protrusion 27. When the cover 30 is moved from the first position in which the cover 30 covers the coupling surface 22 and to the second position in which the coupling surface 22 is uncovered, the gap allows the insert 50 to avoid contacting the protrusion 27 of the electrical connector 26. In other implementations, the recess 53 may be an aperture formed through the insert 50.

In some implementations, as shown in FIGS. 2, 4A-4C, and 5, the cover 30 includes the supporting component 40 positioned between an interior surface 35 of the cover shell 32 and the insert 50. The supporting component 40 is operable to position the insert 50 so that the insert 50 contacts the hydraulic connectors 24 when the cover 30 is in the first position.

The supporting component 40 includes a contact piece 42 and walls 44. A first end surface 422 of the contact piece 42 couples to a surface of the insert 50, opposite the absorbing surface 52. In some implementations, the first end surface 422 is flat. The insert 50 conforms to the first end surface 422. Consequently, the insert 50 maintains a flat configuration when coupled to the first end surface 422. One end 441 of the walls 44 abuts or integrates with a second end surface 424 of the contact piece 42. Thus, in some implementations, the contact piece 42 and the walls 44 define an integral or unitary component. The walls 44 cooperate with the second end surface 424 of the contact piece 42 to form multiple voids or chambers 46. The other end 443 of the wall 44 abuts the interior surface 35 of the cover shell 32, as shown in FIG. 5. By forming the chambers 46, the material forming the supporting component 40 is reduced, and the weight of the supporting component 40 is correspondingly reduced. As a result, a weight of the cover 30 that includes the supporting component 40 and the insert 50 is reduced. The cover shell 32 protrudes to form the sloped surface 312 at the exterior 31 of the cover shell 32.

The supporting component 40 includes a passage 45. The passage 45 of the supporting component 40 aligns with the recess 53 of the insert 50 to form a single passage when the supporting component 40 and the insert 50 are coupled together.

The cover shell 32 can retain the supporting component 40 in various ways. In one example, the end 443 of the wall 44 adjacent to the interior cavity 33 of the cover shell 32 includes an adhesive that secures the supporting component 40 to the cover shell 32. Alternatively, the cover shell 32 can include one or more fastening elements (not shown), such as hook-and-loop fasteners, a hook or pin, to secure the supporting component 40 within the interior cavity 33 of the cover shell 32.

The cover shell 32 can retain the insert 50 by various ways. In one example, the first end surface 422 of the supporting component 40 may include an adhesive that secures the insert 50 to the supporting component 40. Alternatively, the cover shell 32 may include one or more fastening elements (not shown), such as hook-and-loop fasteners, a hook, a pin, or other means to hold the edge of the insert 50.

Figure 3:
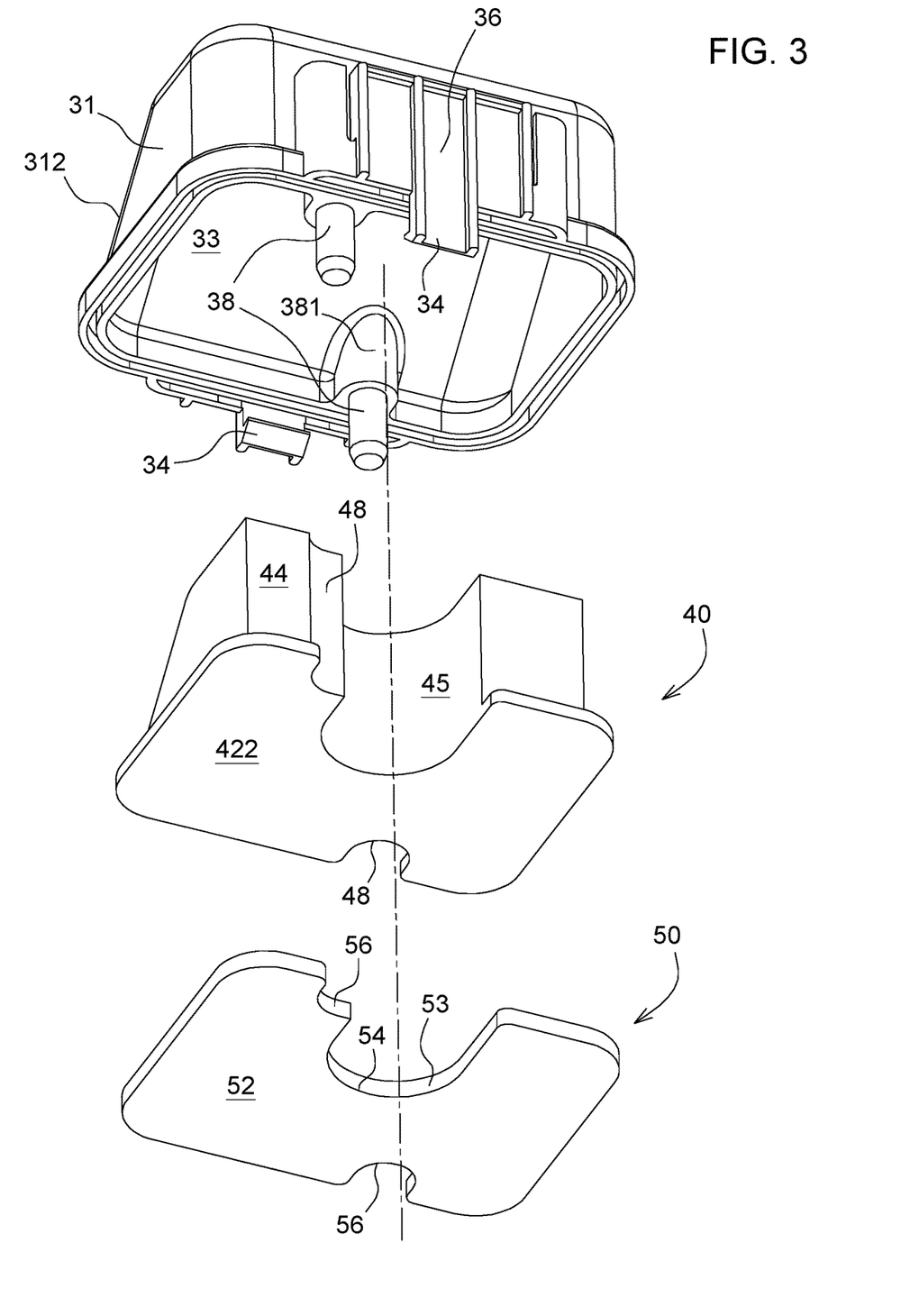
FIG. 3 is an exploded view of the cover of FIG. 1A from a different perspective.
Figure 4A:
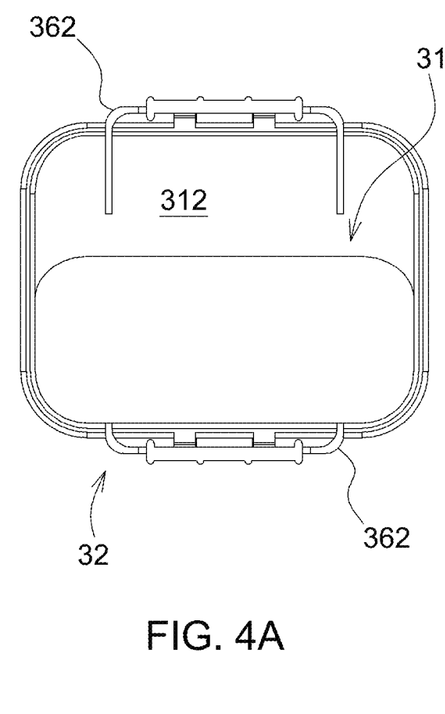
FIG. 4A is a top view of a cover shell.
Figure 4B:
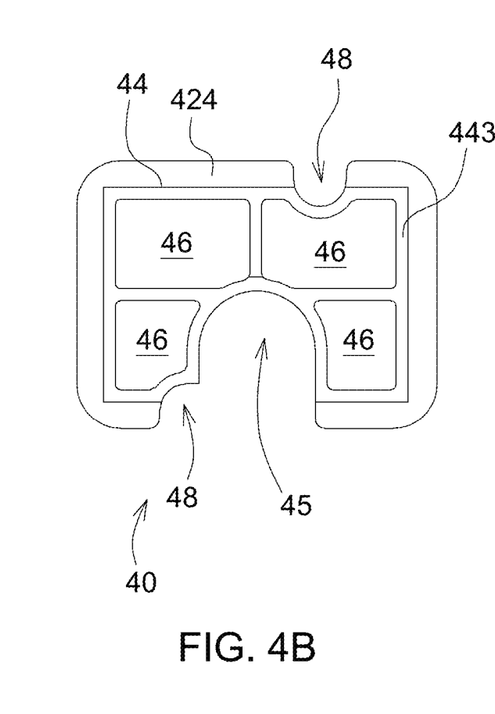
FIG. 4B is a top view of a supporting component having chambers.
Figure 4C:
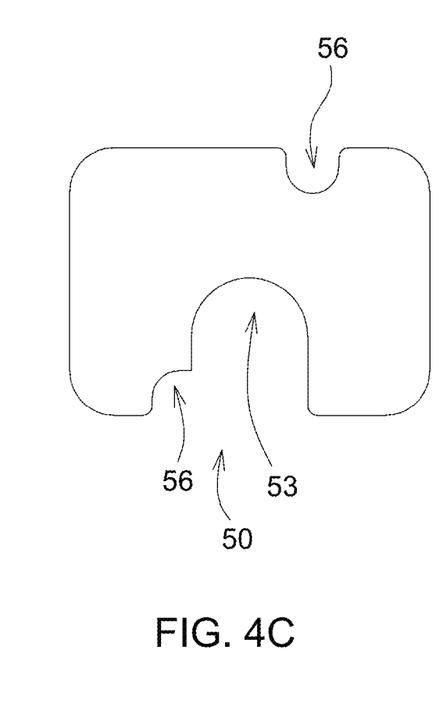
FIG. 4C is a top view of a surface of an insert opposite an absorbing surface.

Referring to FIGS. 2 and 3, the cover 30 includes at least one retaining pin 38 coupled to the cover shell 32. In the illustrated implementation, two retaining pins 38 are included. The retaining pins 38 are used to align the cover 30 with the first portion 20 of the multi-coupler 10 when cover 30 is placed in the first position, covering the coupling surface 22. The first portion 20 of the multi-coupler 10 includes two pin engagement recesses 28 that receive the retaining pins 38. The retaining pins 38 are received into the pin engagement recess 28 when the cover 30 is in the first position, such that the absorbing surface 52 of the insert 50 contacts the hydraulic connectors 24 and the protrusion 27 of the electrical connector 26 extends into the recess 53 of the insert 50.

In the illustrated example, the supporting component 40 includes two bores 48, and the insert 50 includes two apertures 56 that align with the bores 48. The bores 48 and corresponding apertures 56 combine to form passages that receive the retaining pin 38, a base 381 (FIG. 3) of the retaining pin 38, or both. The locations of the bores 48, apertures 56, and the pin engagement recesses 28 align in an axial direction of the retaining pins 38.

Referring to FIGS. 1A and 5, the cover shell 32 includes two latches 36 coupled to the exterior 31 of the cover shell 32. Two sides of each of the latch 36 form corners 362 to connect the exterior 31 of the cover shell 32 so as to create a space 364 between the latch 36 and the exterior 31. Each of the latch 36 has a lock portion 34 at its end to selectively engage with the first portion 20. In this implementation, each of the lock portions 34 is configured as a hook shape. As shown in FIG. 5, the lock portions 34 lockingly engage with a surface 29 of the first portion 20. Remove the cover 30 from the first portion 20 is achieved by pressing the two latches 36 towards each other so as to unhook and release the lock portions 34.

Figure 6:
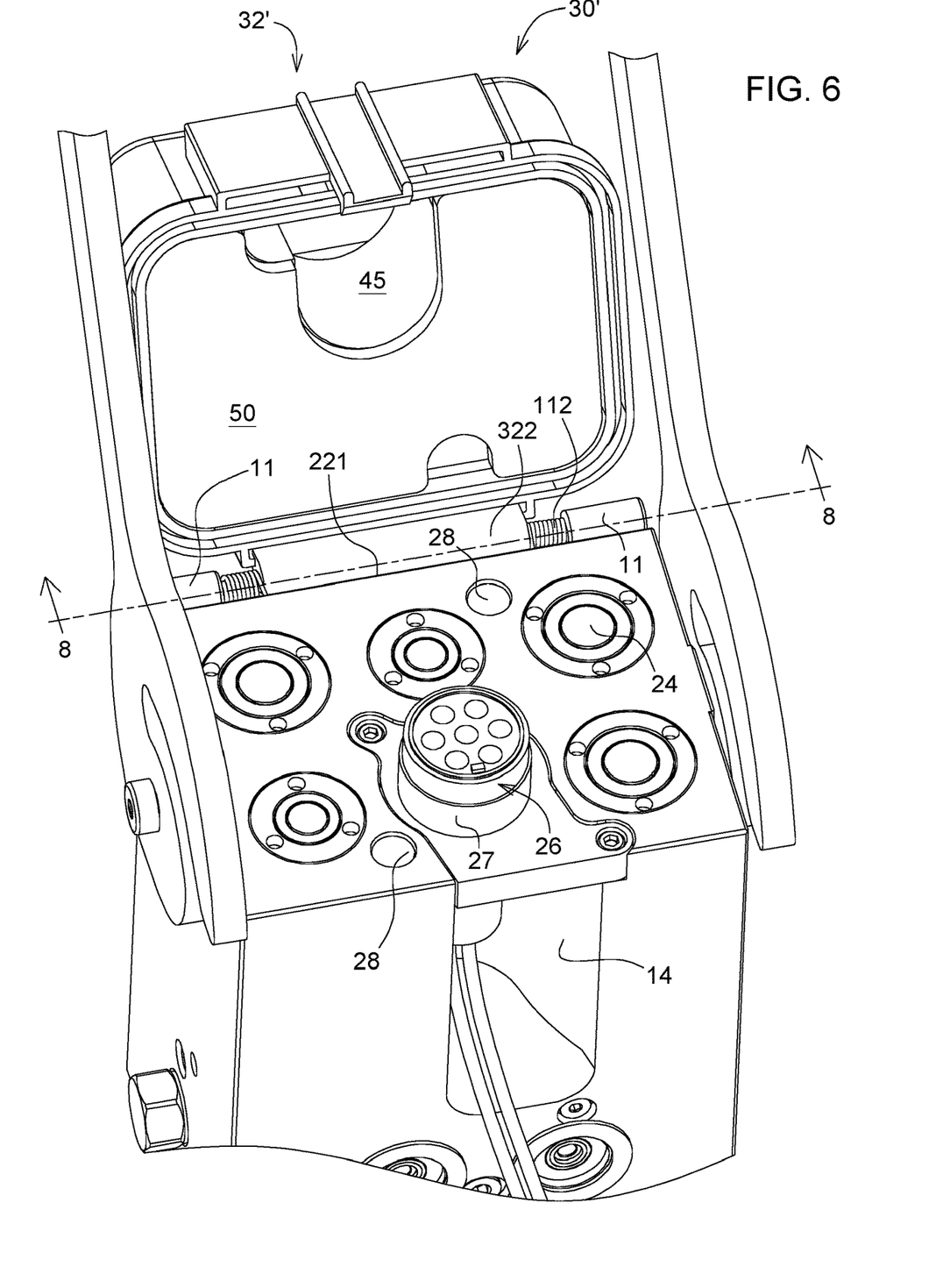
FIG. 6 is a perspective view of another example multi-coupler with a cover in a second position.
Figure 7:
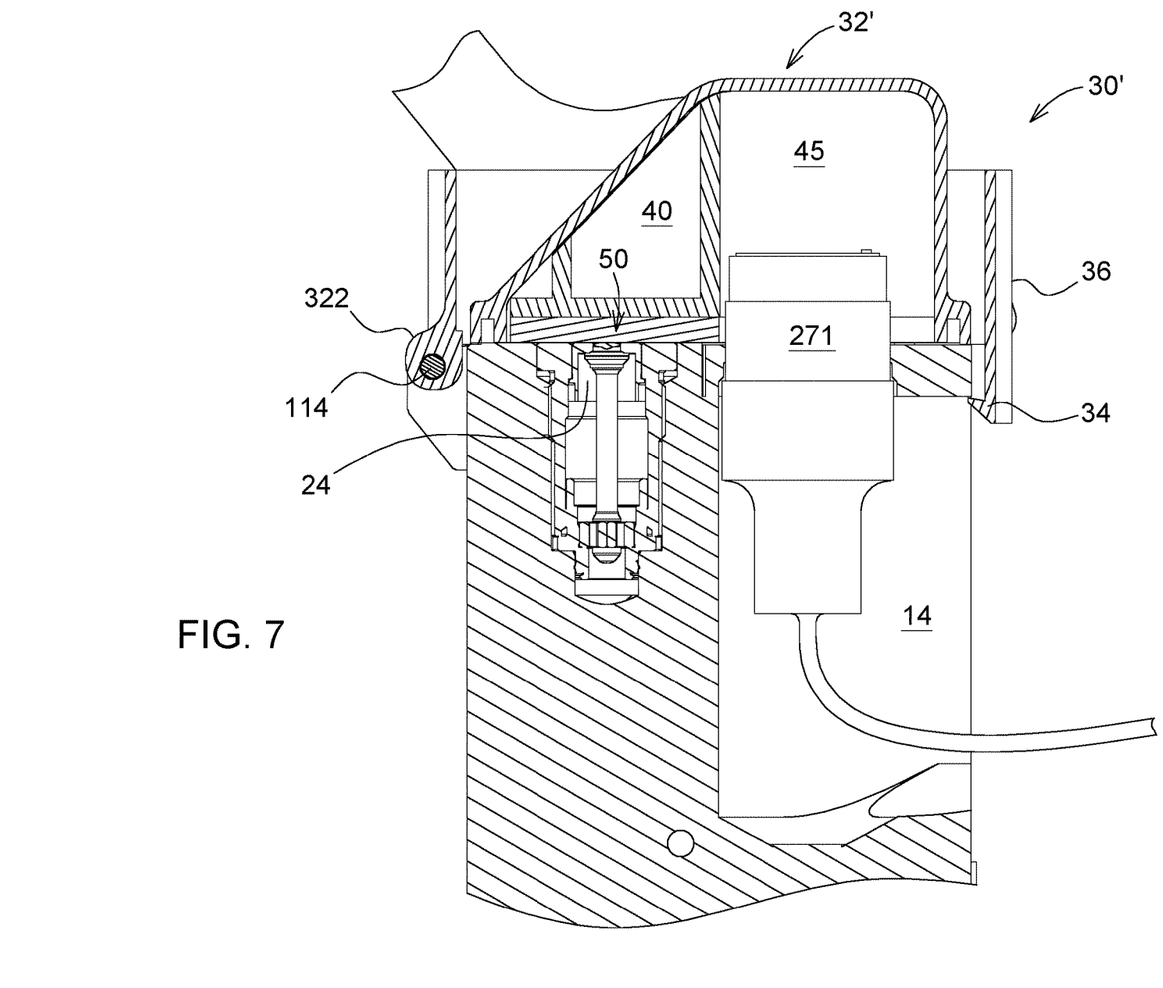
FIG. 7 is a cross-sectional view of the multi-coupler of FIG. 6 with the cover in a first position.
Figure 8:
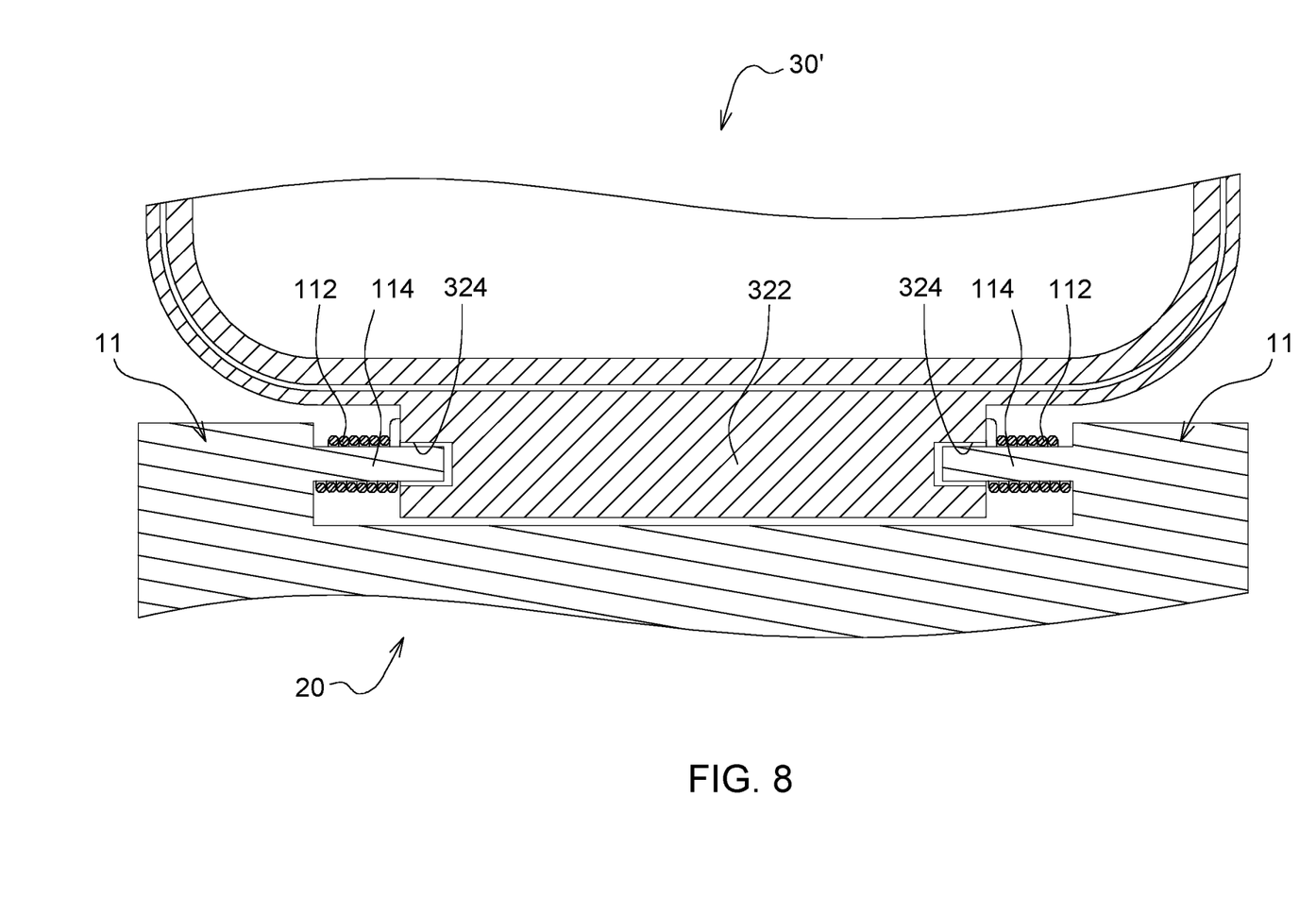
FIG. 8 is a cross-sectional view of the multi-coupler of FIG. 6 as viewed along view line 8-8 of FIG. 6.

FIGS. 6, 7, and 8 illustrate another implementation of the multi-coupler 10. In this example, hinge units 11 are included to achieve a pivotal movement for a cover 30'. The first portion 20 has two hinge units 11 positioned along one side 221 of the coupling surface 22. A cover shell 32' of the cover 30' includes a protrusion 322 that is received between the two hinge units 11. The protrusion 322 defines bores 324 at opposing ends thereof (or a single bore that extends through an entirety of the protrusion). Pins 114 are received into the bores formed in the protrusion 322. One pin 114 extends between one of the hinge units 11 and one of the bores 324 formed in the protrusion 322, and the other pin 114 extends between the other hinge unit 11 and the other bores 324 formed in the protrusion 322, such that the cover 30 is pivotable relative to the first portion 20. Each hinge units 11 engages with a spring 112 to provide a biasing force that biases the cover 30 towards one of the first position or the second position. For example, the springs 122 imparts a biasing force to rotate the cover 30' from the first position to the second position when the operator releases a latch, such as by latch 36 to unhook one side of the cover 30'. Thus, the springs 122 provide a force to pivot the cover 30' back to the first position.

Without in any way limiting the scope, interpretation, or application of the claims appearing below, a technical effect of one or more of the example embodiments disclosed herein is to provide a replaceable insert that can absorb the hydraulic fluid from the hydraulic connectors (couplers). Another technical effect of one or more of the example embodiments disclosed herein is to provide a supporting component having multiple chambers to ensure the cover is light and also supporting the aforementioned insert to contact the coupling surface of the first portion. Another technical effect of one or more of the example embodiments disclosed herein is the insert having a recess such that an electrical connector will not contact the insert.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A multi-coupler of a work vehicle, comprising:
   a first portion comprising: a coupling surface, and a first hydraulic connector arranged on the coupling surface; and
   a cover movable between a first position in which the cover covers the coupling surface and a second position in which the coupling surface is uncovered by the cover, the cover comprising:
   a cover shell defining an interior cavity;
   an insert received into the interior cavity of the cover shell, the insert operable to absorb a fluid that escapes from the first hydraulic connector.

2. The multi-coupler of a work vehicle of claim 1, wherein the insert comprises an absorbing surface that faces the coupling surface and contacts the first hydraulic connector when the cover is in the first position.

3. The multi-coupler of a work vehicle of claim 2, wherein the first portion connects or comprises an electrical connector arranged on the coupling surface.

4. The multi-coupler of a work vehicle of claim 3, wherein the insert comprises a recess in the absorbing surface.

5. The multi-coupler of a work vehicle of claim 4, wherein the electrical connector comprises a protrusion protruding from the coupling surface, wherein a location of the protrusion aligns with a location of the recess formed in the absorbing surface.

6. The multi-coupler of a work vehicle of claim 5, wherein an outer surface of the protrusion is received into the recess without contacting the insert.

7. The multi-coupler of a work vehicle of claim 2, wherein the cover shell protrudes to form a sloped surface at an exterior of the cover shell.

8. The multi-coupler of a work vehicle of claim 2, further comprising a supporting component positioned between an interior surface of the cover shell and the insert, wherein the supporting component is operable to support the insert to contact the first hydraulic connector.

9. The multi-coupler of a work vehicle of claim 8, wherein the supporting component includes a contact piece and at least one wall, a first end surface of the contact piece is coupled to a surface opposite the absorbing surface of the insert, the at least one wall forms at least one chamber, and one end of the at least one wall abuts a second end surface of the contact piece, and the other end of the at least one wall abuts the interior surface of the cover shell.

10. The multi-coupler of a work vehicle of claim 2, wherein the first portion further comprises a pin engagement recess, wherein the cover further comprises a retaining pin coupled to the cover shell, and wherein the retaining pin is received into the pin engagement recess when the cover is in the first position.

11. The multi-coupler of a work vehicle of claim 10, wherein the first portion further comprises a second pin engagement recess, and wherein the cover includes a second retaining pin coupled to the cover shell and wherein the second retaining pin is received into the second pin engagement recess when the cover is in the first position.

12. The multi-coupler of a work vehicle of claim 10, wherein the insert comprises an aperture operable for the retaining pin passing through.

13. The multi-coupler of a work vehicle of claim 12, wherein the aperture of the insert is formed at an edge of the insert.

14. The multi-coupler of a work vehicle of claim 1, further comprising an electrical connector, and wherein the cover covers the electrical connector and the first hydraulic connector when the cover is in the first position and wherein the insert contacts the first hydraulic connector when the cover is in the first position.

15. The multi-coupler of a work vehicle of claim 1, wherein the cover shell is detachable or pivotable relative to the first portion.

16. A cover operable of a multi-coupler of a work vehicle, comprising:
- a cover shell movable relative to a first portion of the multi-coupler between a first position in which the cover shell covers a first hydraulic connector and a second position in which the cover shell exposes the first hydraulic connector; and
- an insert received into an interior cavity formed by the cover shell, the insert formed of a material that absorbs a fluid released from the first hydraulic connector.

17. The cover of claim 16, wherein the insert comprises an absorbing surface that faces a coupling surface of the first portion and contacts the first hydraulic connector when the cover is in the first position.

18. The cover of claim 17, wherein the first portion connects or comprises an electrical connector arranged on the coupling surface, and the insert comprises a recess in the absorbing surface.

19. The cover of claim 18, wherein the electrical connector comprises a protrusion protruding from the coupling surface, wherein a location of the protrusion aligns with a location of the recess formed in the absorbing surface.

* * * * *